United States Patent
Orilall et al.

(10) Patent No.: US 10,086,500 B2
(45) Date of Patent: Oct. 2, 2018

(54) METHOD OF MANUFACTURING A UV CURABLE CMP POLISHING PAD

(71) Applicant: Applied Materials, Inc., Santa Clara, CA (US)

(72) Inventors: Mahendra Christopher Orilall, Santa Clara, CA (US); Rajeev Bajaj, Fremont, CA (US); Fred C. Redeker, Fremont, CA (US)

(73) Assignee: Applied Materials, Inc., Santa Clara, CA (US)

(*) Notice: Subject to any disclaimer, the term of this patent is extended or adjusted under 35 U.S.C. 154(b) by 663 days.

(21) Appl. No.: 14/575,608

(22) Filed: Dec. 18, 2014

(65) Prior Publication Data

US 2016/0176021 A1    Jun. 23, 2016

(51) Int. Cl.
*B24D 11/00* (2006.01)
*B24D 3/32* (2006.01)
*B29C 35/08* (2006.01)

(52) U.S. Cl.
CPC .............. *B24D 11/001* (2013.01); *B24D 3/32* (2013.01); *B24D 11/00* (2013.01); *B29C 35/0805* (2013.01); *B29C 35/0888* (2013.01); *B29C 2035/0822* (2013.01); *B29C 2035/0827* (2013.01)

(58) Field of Classification Search
CPC ....................................................... B24D 3/32
See application file for complete search history.

(56) References Cited

U.S. PATENT DOCUMENTS

| | | | |
|---|---|---|---|
| 5,378,251 A * | 1/1995 | Culler | B24D 3/002 |
| | | | 451/28 |
| 5,490,808 A | 2/1996 | Jantschek et al. | |
| 7,169,031 B1 | 1/2007 | Fletcher et al. | |
| 2002/0086615 A1 | 7/2002 | Moon | |
| 2002/0127862 A1 | 9/2002 | Cooper et al. | |
| 2006/0178099 A1 * | 8/2006 | Hishiki | B24B 37/205 |
| | | | 451/521 |
| 2006/0228439 A1 | 10/2006 | James et al. | |
| 2008/0146129 A1 * | 6/2008 | Kouzuma | B24B 37/24 |
| | | | 451/527 |
| 2013/0340351 A1 * | 12/2013 | Fukuda | B24B 37/22 |
| | | | 51/296 |

FOREIGN PATENT DOCUMENTS

| | | |
|---|---|---|
| JP | 2006-320998 | 11/2006 |
| JP | 2010-167512 | 8/2010 |

OTHER PUBLICATIONS

International Search Report in International Application No. as PCT/US2015/061647, dated Feb. 29, 2016, 10 pages.

* cited by examiner

*Primary Examiner* — Benjamin A Schiffman
(74) *Attorney, Agent, or Firm* — Fish & Richardson P.C.

(57) ABSTRACT

A method of fabricating a chemical mechanical polishing pad includes introducing polymer precursors containing acrylate functional groups into a mold, providing abrasive particles and a photo-initiator in the polymer precursors to form a mixture, and while the mixture is contained between a bottom plate and a top cover of the mold, exposing the mixture to ultraviolet radiation through a transparent section of the mold to cause the polymer precursors to form radicals, forming a polymer matrix from the polymer precursor by causing the radicals to cross-link with one another. The polishing layer includes the polymer matrix having the abrasive particles dispersed therein.

16 Claims, 4 Drawing Sheets

METHOD OF MANUFACTURING A UV CURABLE CMP POLISHING PAD

TECHNICAL FIELD

This present invention relates to polishing pads used in chemical mechanical polishing.

BACKGROUND

An integrated circuit is typically formed on a substrate by the sequential deposition of conductive, semiconductive, or insulative layers on a silicon wafer. A variety of fabrication processes require planarization of a layer on the substrate. For example, for certain applications, e.g., polishing of a metal layer to form vias, plugs, and lines in the trenches of a patterned layer, an overlying layer is planarized until the top surface of a patterned layer is exposed. In other applications, e.g., planarization of a dielectric layer for photolithography, an overlying layer is polished until a desired thickness remains over the underlying layer.

Chemical mechanical polishing (CMP) is one accepted method of planarization. This planarization method typically requires that the substrate be mounted on a carrier head. The exposed surface of the substrate is typically placed against a rotating polishing pad. The carrier head provides a controllable load on the substrate to push it against the polishing pad. A polishing liquid, such as slurry with abrasive particles, is typically supplied to the surface of the polishing pad to provide an abrasive chemical solution at the interface between the pad and the substrate. The slurry can also contain a chemically-reactive agent, such as KOH.

One objective of a chemical mechanical polishing process is polishing uniformity. If different areas on the substrate are polished at different rates, then it is possible for some areas of the substrate to have too much material removed ("overpolishing") or too little material removed ("underpolishing"). Besides a high polishing rate, it is also desirable for the chemical mechanical polishing process to provide a polished substrate surface that lacks small-scale roughness, contains minimal defects and is flat, i.e., lacks large scale topography.

Polishing pads are typically made by molding, casting or sintering polymeric (e.g., polyurethane) materials. Reaction injection molding or cast urethane can involve mixing two or more reactive chemicals at an appropriate ratio in a liquid state. For example, a first pre-polymer containing a first reactive functional chemical end-group (e.g., isocynate) can be reacted with a corresponding second pre-polymer containing lower molecular weight material having another reactive functional chemical end-group (e.g., polyol). This chemical reaction between the first reactive functional chemical end-group and another reactive functional chemical end-group can result in the chemicals "phasing" or the formation of a product that is solid.

In the case of molding, the polishing pads can be made one at a time, e.g., by injection molding. In the case of casting, the liquid precursor is cast and cured into a cake, which is subsequently sliced into individual pad pieces. These pad pieces can then be machined to a final thickness. Grooves can be machined into the polishing surface, or be formed as part of the injection molding process.

In addition to planarization, polishing pads can be used for finishing operations such as buffing.

SUMMARY

The methods and systems described herein allow higher tunability in processes used to produce polishing pads. For example, moieties such as inorganic particles (e.g., nanoparticles) can be added into the reaction mixture used to form the CMP polishing pad. CMP polishing pads generally have sufficient mechanical integrity, chemical resistivity (i.e., able to withstand chemicals used in CMP polishing without degrading, delaminating, blistering or warping), and sufficient hydrophilicity such that aqueous-based abrasive containing slurry can wet the surface of the pad.

Mechanically, the CMP polishing pads should have sufficient strength to resist tearing during polishing, depending on material being polished, have acceptable levels of hardness and modulus for planarity, good abrasion resistance to prevent excessive pad wear during polishing, and be able to retain mechanical properties when wet.

In one aspect, a method of fabricating a chemical mechanical polishing pad includes introducing polymer precursors containing acrylate functional groups into a mold, providing abrasive particles and a photo-initiator in the polymer precursors to form a mixture. While the mixture is contained between a bottom plate and a top cover of the mold, exposing the mixture to ultraviolet radiation through a transparent section of the mold to cause the polymer precursors to form radicals. The method includes forming a polymer matrix from the polymer precursor by causing the radicals to cross-link with one another. The polishing layer includes the polymer matrix having the abrasive particles dispersed therein.

Implementations can include one or more of the following features. Mixing of the polymer precursor, the abrasive particles, and the photo-initiator in the presence of a gas, the mixing performed at sufficient rapidity to generate gas bubbles in the mixture. Immediately exposing the mixture to the ultraviolet radiation to trap the gas bubbles in the polishing layer. Introducing bubbles of gas to the polymer precursor prior to mixing the polymer precursor, the abrasive nanoparticle, the photo-initiator, and exposing the mixture to radiation immediately after mixing the polymer precursor. Introducing porogens to the mixture before exposing the mixture to the ultraviolet radiation to provide pores in the polishing layer. The ultraviolet radiation produces radicals from the polymer precursor and the polymer precursors are cured by cross-linking of the radicals. The polymer precursors containing acrylate functional groups include an acrylate oligomer, or a reactive acrylate monomer, wherein cross-linking occurs between unsaturated carbon-carbon bonds in the acrylate oligomers or reactive acrylate monomer. The polymer precursor includes 54-98.5 wt % of polyurethane acrylate oligomer and 0-30% acrylate monomer, and the abrasive particles include 1-10% ceria nanoparticles and the initiator includes 0.5-5% of a photo initiator. Exposing the mixture to ultraviolet radiation includes exposing the mixture first to ultraviolet radiation in a first wavelength band, and then exposing the mixture to ultraviolet radiation in a second wavelength band having wavelengths shorter than the first wavelength band. A thermal initiator and the mixture is subjected to temperature sufficient to activate the thermal initiator. The abrasive particles have dimensions between 5 nm-50 microns and include one or more of $SiO_2$, $CeO_2$, $TiO_2$, $Al_2O_3$ $BaTiO_3$, $HfO_2$, $SrTiO_3$, $ZrO_2$, $SnO_2$, MgO, CaO, $Y_2O_3$, or $CaCO_3$. Exposing the mixture to infrared (IR) radiation and using a thermal initiator to activate curing of the polymer precursor, the thermal initiator configured to generate gas bubbles in the mixture, and trapping the gas bubbles to create porosity in the polishing layer. The particles include surfactants disposed on surfaces thereof. The surfactants reduce settling of the particles in the mixture.

In another aspect, a system includes a conveyor belt having a width, a mold configured to hold a polymer precursor between a bottom plate and a top cover of the mold, the mold configured to be supported and transported by the conveyor belt, the mold having a width smaller than the width of the conveyor belt. A dispenser to dispense into the mold a mixture that includes the polymer precursor, abrasive particles and an initiator, an array of radiation sources mounted across the width of the conveyor belt, the top cover over the mold having a UV transparent section through which radiation from the array of radiation sources can pass through to cure the mixture in the mold to form an entire thickness of a polishing layer. The top cover configured to create a level profile on a surface of the mixture directly facing the array of radiation sources. A device configured to separate the polishing layer from the bottom plate and the top cover.

Implementations can include one or more of the following features. The array of radiation sources includes ultraviolet (UV) radiation sources and the array of radiation sources includes an array of gallium doped (V) bulbs in front of an array of iron doped (D) bulbs, along a direction of travel of the conveyor belt. The array of radiation sources includes infrared (IR) sources.

In another aspect, a method of fabricating a chemical mechanical polishing pad includes introducing a polymer precursor into a mold, providing abrasive particles and a photo-initiator in the polymer precursor to form a mixture. While the mixture is contained between a bottom plate and a top cover of the mold, exposing the mixture to ultraviolet radiation through a transparent section of the mold to cure the polymer precursor to form an entire thickness of a polishing layer. The polishing layer includes a polymer matrix having the abrasive particles dispersed therein. The method includes separating the polishing layer from the bottom plate and the top cover.

Implementations can include one or more of the following features. Providing the abrasive particles includes introducing abrasive particles into the polymer precursor while the polymer precursor is in the mold. Providing the abrasive particles includes introducing inorganic precursors that react in the mixture to form abrasive particles. The polymer precursors include polyurethane acrylate, polyester acrylate or polyether acrylate. The cross-linking occurs between unsaturated carbon-carbon bonds in the acrylate oligomers or reactive acrylate monomer. Using the top cover to create a level profile on a surface of the mixture closest to the ultraviolet radiation. The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
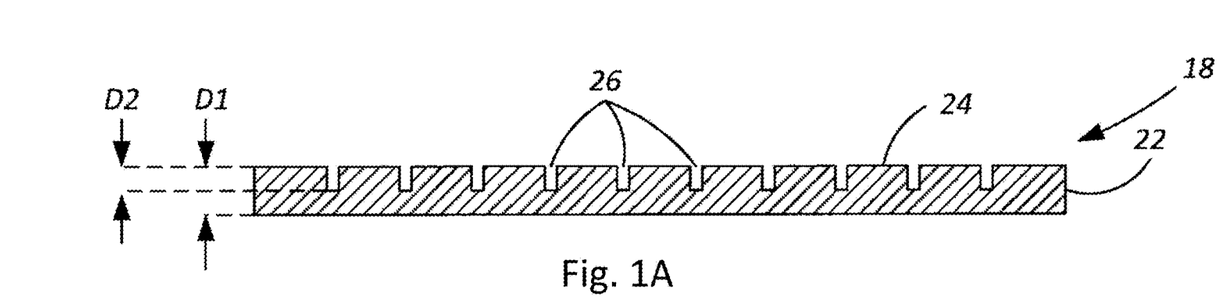
FIG. 1A is a schematic cross-sectional side view of an example polishing pad.
Figure 1B:
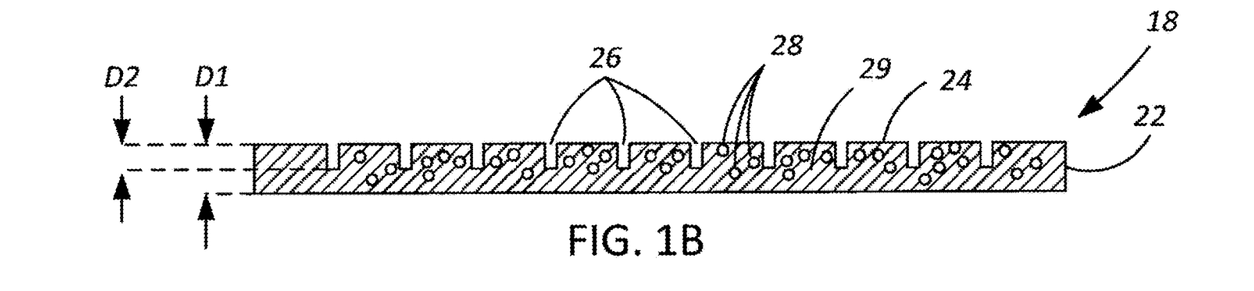
FIG. 1B is a schematic cross-sectional side view of another example polishing pad.
Figure 1C:
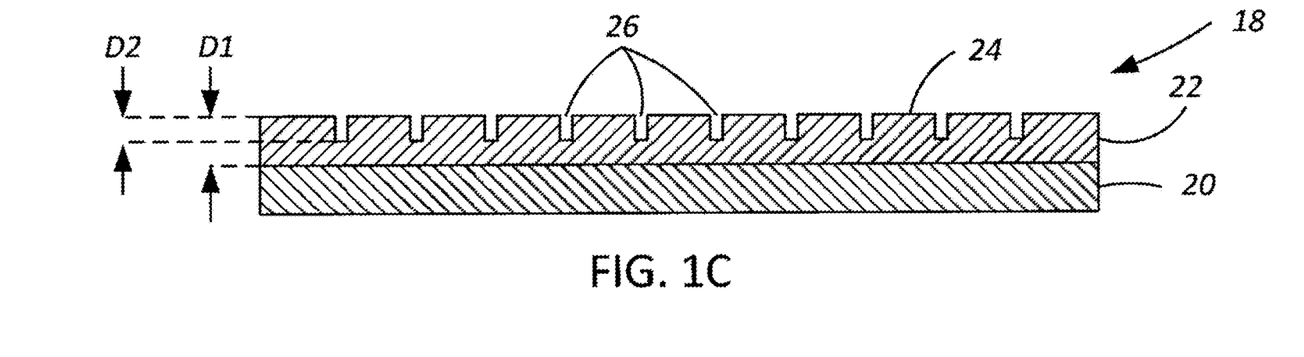
FIG. 1C is a schematic cross-sectional side view of yet another example polishing pad.

Referring to FIG. 1A-1C, a polishing pad 18 includes a polishing layer 22. As shown in FIG. 1A, the polishing pad can be a single-layer pad formed from the polishing layer 22, or as shown in FIG. 1C, the polishing pad can be a multi-layer pad that includes the polishing layer 22 and at least one backing layer 20. The polishing layer 22 can be a material that is inert in the polishing process. The material of the polishing layer 22 can be a polymeric material such as polyurethane acrylates, poly epoxy acrylate, poly ester acrylates, poly ether acrylates, or acrylates of polycarbonates, nylons, polysulfones, acrylonitrile butadiene styrene (ABS) copolymer, polyetherimide, or polyamides. In general, the material of the polishing layer 22 can include an acrylic moiety or some other species that can be cross-linked via UV radiation. In some implementations the polishing layer 22 is a relative durable and hard material.

The polishing layer 22 can be a layer of homogeneous composition (as shown in FIG. 1A), or the polishing layer 22 can include abrasive particles 28 held in a matrix 29 of plastic material, e.g., polyurethane acrylates, poly epoxy acrylate, poly ester acrylates, poly ether acrylates, or acrylates of polycarbonates, nylons, polysulfones, acrylonitrile butadiene styrene (ABS) copolymer, polyetherimide, or polyamides (as shown in FIG. 1B).

The abrasive particles 28 are harder than the material of the matrix 29. The abrasive particles 28 can be from 0.05 wt % to 75 wt % of the polishing layer. The material of the abrasive particles can be a metal oxide, such as ceria, alumina, titania, silica, $BaTiO_3$, $HfO_2$, $SrTiO_3$, $ZrO_2$, $SnO_2$, MgO, CaO, $Y_2O_3$, $CaCO_3$ or a combination thereof, polymeric, inter-metallic or ceramics. The abrasive particles can be directly added to the polymer precursor solution as preformed particles (e.g., nanoparticles) or they can be introduced as inorganic precursors of inorganic sol-gel reactions that yield the desired particles. For example, inorganic precursors such as titanium chloride and titanium ethoxide can be reacted to form $TiO_2$ particles. The use of inorganic precursors is less expensive than the use of preformed particles (e.g., nanoparticles) and could help to reduce the manufacturing cost of the polishing layer.

The polishing pad 18 can have a thickness D1 of 80 mils or less, e.g., 50 mils or less, e.g., 25 mils or less. Because the conditioning process tends to wear away the polishing layer, its thickness can be selected to provide the polishing pad 18 with a useful lifetime, e.g., 3000 polishing and conditioning cycles.

Figure 1D:
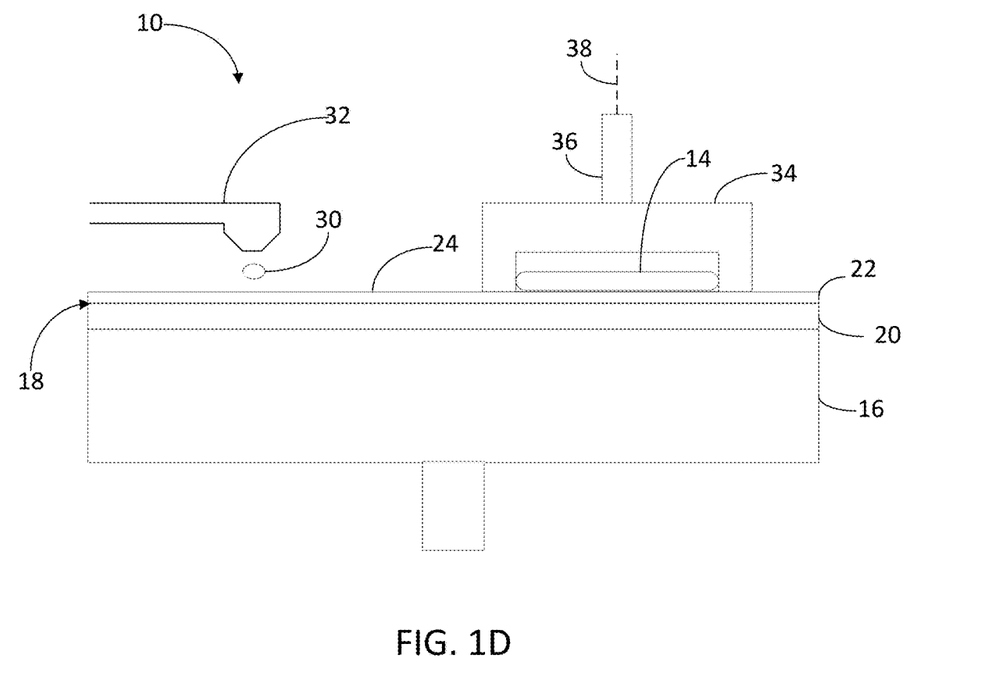
FIG. 1D is schematic side view, partially cross-sectional, of a chemical mechanical polishing station.

As shown in FIG. 1D, one or more substrates 14 can be polished at a polishing station 10 of a CMP apparatus. A description of a suitable polishing apparatus can be found in U.S. Pat. No. 5,738,574, the entire disclosure of which is incorporated herein by reference. The polishing station 10 can include a rotatable platen 16 on which is placed the polishing pad 18. During a polishing step, a polishing liquid 30, e.g., abrasive slurry, can be supplied to the surface of polishing pad 18 by a slurry supply port or combined slurry/rinse arm 32. The polishing liquid 30 can contain abrasive particles, a pH adjuster, or chemically active components.

The substrate 14 is held against the polishing pad 18 by a carrier head 34. The carrier head 34 is suspended from a support structure, such as a carousel, and is connected by a carrier drive shaft 36 to a carrier head rotation motor so that the carrier head can rotate about an axis 38. The relative motion of the polishing pad 18 and the substrate 14 in the presence of the polishing liquid 30 results in polishing of the substrate 14.

Figure 2A:
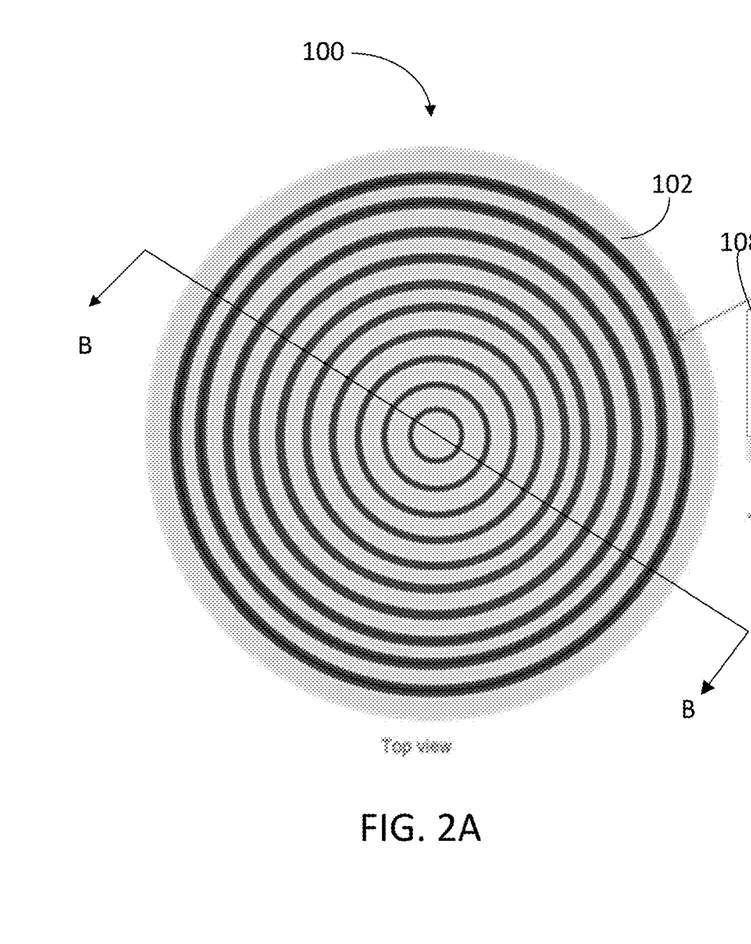
FIG. 2A is a top view of a mold.

FIG. 2A shows a top view of a mold 100 suitable for the manufacture of CMP polishing layers. Pads can be made one at a time or as a cake.

For polishing pads made as a cake, individual pads from which the cake is sliced are machined to a final thickness, and grooves can be further machined into the pads. For polishing pads made by molding, grooves can be formed as part of the molding process by providing a complementary structures in the mold, or by machining after the pad is formed.

For example, grooves 26 (in FIGS. 1A-1C) formed in at least a portion of the polishing surface 24 can carry slurry. The grooves 26 may be of nearly any pattern, such as concentric circles, straight lines, a cross-hatched, spirals, and the like. When grooves are present, the polishing surface 24, i.e., the plateaus between the grooves 26, can be about 25-90% of the total horizontal surface area of the polishing layer 22. Thus, the grooves 26 can occupy 10%-75% of the total horizontal surface area of the polishing pad 18. The plateaus between the grooves 26 can have a lateral width of about 0.1 to 2.5 mm.

On a microscopic scale, the polishing surface 24 of the polishing layer 22 can have rough surface texture, e.g., 2-4 microns rms. For example, the polishing layer 22 can be subject to a grinding or conditioning process to generate the rough surface texture.

Although the polishing surface 24 can be rough on a microscopic scale, the polishing layer 22 can have good thickness uniformity on the macroscopic scale of the polishing pad itself (this uniformity refer to the global variation in height of the polishing surface 24 relative to the bottom surface of the polishing layer, and does not count any macroscopic grooves or perforations deliberately formed in the polishing layer). For example, the thickness non-uniformity can be less than 1 mil. CMP pad material that is cured can be used as a CMP polishing pad if the thickness of the pad material is within a tolerance range of 5 mils. Otherwise, the cured pad can be machined down to this thickness. The pad with correct thickness can be used by itself as a CMP polishing pad or adhered to a softer sup-pad or backing layer.

The backing layer can be an open-cell or a closed-cell foam, such as polyurethane or polysilicone with voids, so that under pressure the cells collapse and the backing layer compresses. A suitable material for the backing layer is PORON 4701-30 from Rogers Corporation, in Rogers, Conn., or SUBA-IV from Rohm & Haas. The hardness of the backing layer can be adjusted by selection of the layer material and porosity. The backing layer can also be formed of natural rubber, ethylene propylene diene monomer (EPDM) rubber, nitrile, or polychloroprene (neoprene). Alternatively, the backing layer 20 (shown in FIG. C) formed from the same precursor and have the same porosity as the polishing layer, but have a different degree of curing so as to have a different hardness.

Figure 2B:
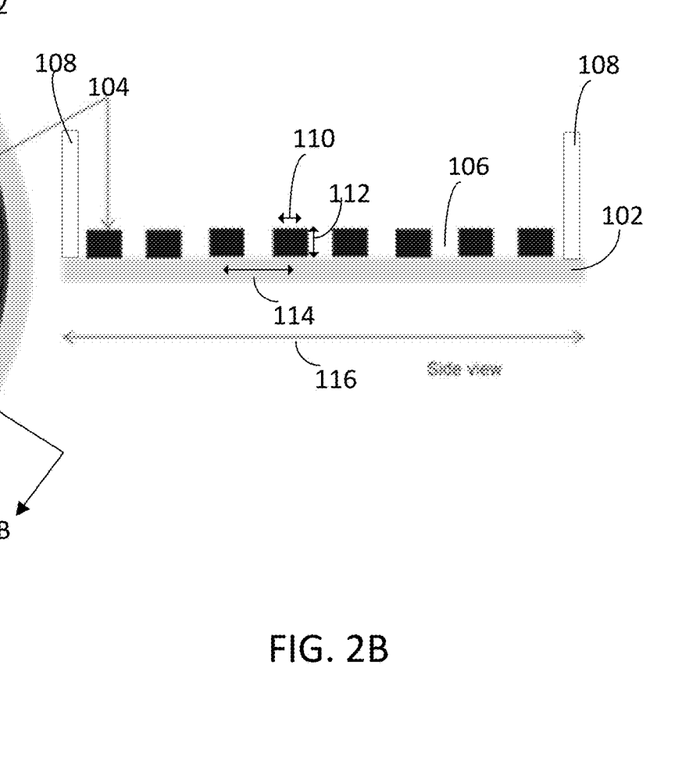
FIG. 2B is a side view of a mold.

The polishing layer can also contain a wide range of microstructures, textures, and fillers. FIG. 2B shows a side view of the mold 100 from which polishing layers can be made. In the implementation shown, the polishing layers are made one at a time. The mold 100 has a base 102 (or bottom cover) and protrusions 104 which allow polishing layers having pre-formed grooves to be formed. The mold 100 is bounded by a circumferential wall 108 that allows the mold 100 to retain liquid phase polymer precursor mixture before the mixture is cured using radiation. The polymer precursor mixture can fill gaps 106 in the mold 100 separated by protrusions 104.

In some embodiments, the mold 100 can have a diameter 116 that is larger than 750 mm (e.g., greater than 770 mm, greater than 774 mm). A width 110 of each protrusion 104 can be about 450 µm, and a height 112 of each protrusion can be 740 µm. The protrusions be spaced radially at a pitch of 3 mm as a series of concentric circles of varying diameters, as shown in FIG. 2A. The circumferential wall 108 can have a height sufficient to produce pads having a height of 0.125 inch (i.e., a height greater than 0.125 inch). The pads can then be machined down to 0.1 inch. In general, the height of the pads (and consequently, the circumferential wall 108) is determined by the current tool design which may be designed for a fixed height. In theory, the height of circumferential wall 108 can be made higher to produce thicker pads which have increased lifetime. The thickness of the tool then be adjusted to accommodate a thickened pad. In some embodiments, the circumferential wall 108 can be 0.25 inch thick. In general, the height of the circumferential wall is determined by how effectively the polymeric formulation can be cured. The circumferential wall 108 may be as high as 2-3 inches. In general, any pad/polishing layer design can be formed by using an appropriate inverse design for the mold.

In some implementations, the polishing layer includes pores, e.g., small voids. The pores can be 50-100 microns wide. Pores within the polishing layer may be helpful in locally retaining slurry within the polishing layer.

Porosity can be achieved in the final cured material by mixing of the viscous mixture containing the polymer precursor, initiators, and particles ("the formulation") in the presence of a gas, e.g., air or nitrogen, at sufficient rapidity to generate gas bubbles. This is followed immediately by UV curing to trap the gas bubbles in place. For example, "sufficient rapidity" can mean that UV curing is conducted before the gas bubbles can escape (which depends on the viscosity of the formulations). In some embodiments, UV curing is conducted less than one minute or as soon as possible (i.e., without delay) after the gases are introduced.

Alternatively, small bubbles of an inert gas (such as nitrogen) can be introduced to the formulation, mixed and immediately cured. Pores can also be achieved by adding porogens such as polyethylene glycol (PEG), polyethylene oxide (PEO), hollow particles/microspheres (of size 5 nm-50 µm), e.g., gelatin, chitosan, $Si_3N_4$, polymethylmethacrylate (PMMA); mesoporous nanoparticles, carboxyl methyl cellulose (CMC), macroporous hydrogels and emulsion microspheres. Most oxide nanoparticles (e.g., silica) can be made mesoporous, by adding some polymers and then burning off the polymers, which leaves pores as the silica does not decompose in the process. Mesoporous can mean pores having dimensions between 2-50 nm, macroporous can mean pores having dimensions typically >100 nm. Microporous can mean pores having dimensions that is less than 2 nm. When porogens, such as PEG, are used, the sizes of the pores can be controlled by varying the molecular weight of the porogen, e.g., the molecular weight of the PEG. Porogens also does not need to be evenly distributed in the polymer matrix. In other words, a homogenous distribution of pores is not necessary.

The presence of nanoparticles in the formulation creates a multi-functional CMP polishing pad after the formulation is cured. "Multi-functional" can mean having various functionalities or integrating the functionalities of other separate components directly into the polishing pad, thus making the other (separate) components expendable. For example, if ceria nanoparticles are incorporated inside the CMP polishing pad, and these nanoparticles are selectively exposed, then ceria nanoparticles that were intended for use as abrasives in CMP slurries can be eliminated. For example, the formulation can include particles which are capable of undergoing chemical reactions during CMP processing to produce desired changes on the layer of the substrate that is being polished.

Examples of chemical reactions used in CMP processing for polishing pad include chemical processes that occur within a basic pH range of 10-14 that involve one or more of potassium hydroxide, ammonium hydroxide and other proprietary chemical processes used by manufactures of slurry. Chemical processes that occur within an acidic pH range of 2-5 involving organic acids such as acetic acid, citric acid can also be used in CMP processing. Oxidization reactions involving hydrogen peroxide are also examples of chemical reactions used in CMP processing. Abrasive particles can be used only to provide mechanically abrasive functions. The particles can have sizes up to 50 µm, e.g., less than 10 µm, e.g., less than 1 µm, and the particles can have different morphology, for example, the particles can be round, elongated or faceted.

Figure 2C:
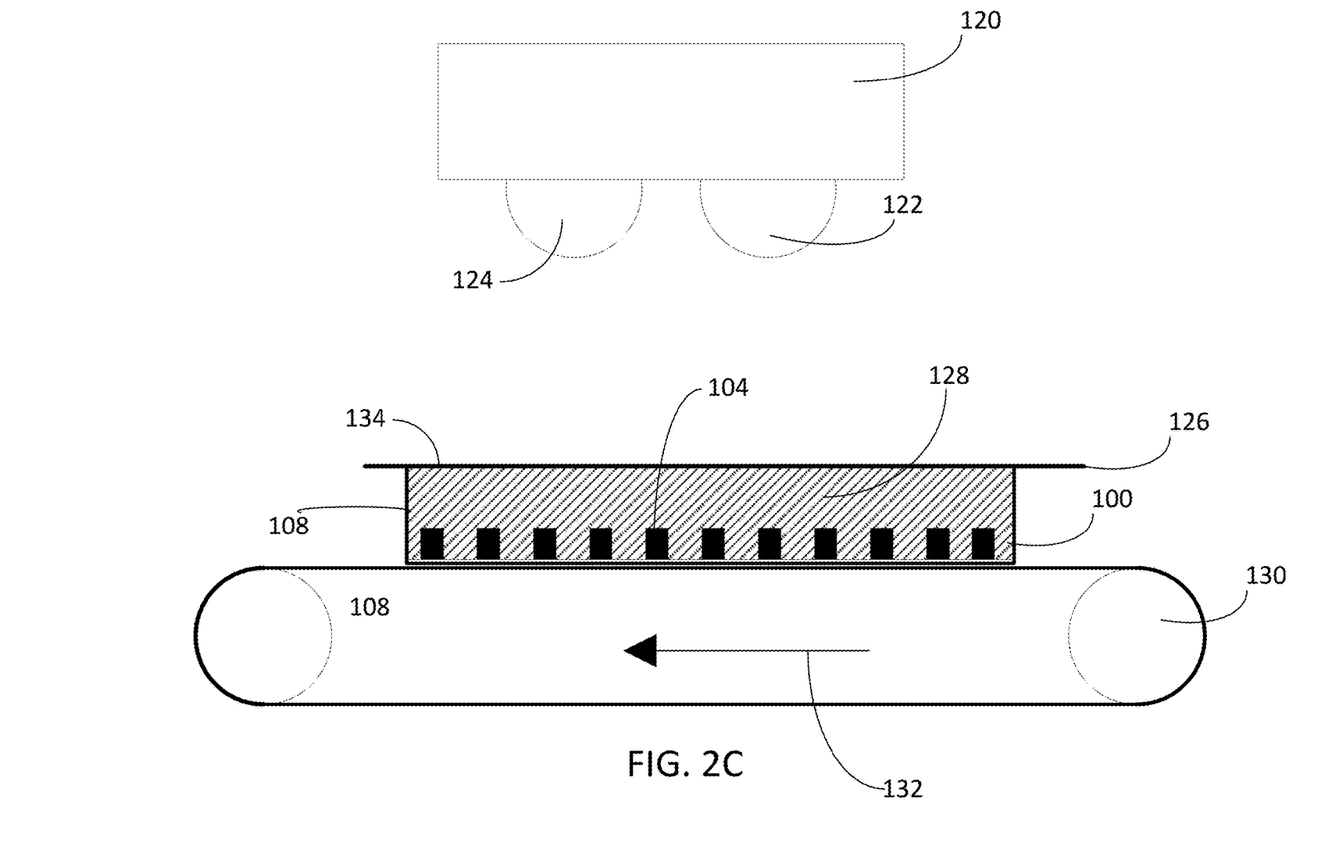
FIG. 2C is a schematic cross-sectional side view of a system for fabricating polishing pads.

FIG. 2C shows how the mold 100 is used to fabricate a polishing pad. An advantage of the methods and systems described herein is the ability for the formulation that includes the polymer precursor, initiators, any porogens, and particles to be mixed together in the mold ("one-pot synthesis"), allowing greater convenience and ease of manufacture. The mold 100 is placed on and supported by a conveyor belt 130 having a width (the dimension into the plane of the drawing) that is at least as large as the diameter 116 of the mold 100, for high throughput manufacturing. Multiple molds 100 can be sequentially processed on the conveyer belt 130.

A formulation 128 containing polymer precursor, particles, and initiators fills the mold 100. The polymer precursor can include UV curable acrylates such as polyurethane acrylate, polyester acrylate and polyether acrylate. UV curable acrylate-based formulation can include both an acrylate oligomer, and a reactive acrylate monomer. The monomer can have a lower viscosity than the oligomer and serves as a photo-initiator. For example, the monomer can be thinner or diluent (i.e., another acrylate moiety having a lower viscosity such that the monomer lowers the viscosity of a higher viscosity oligomer when they are mixed together.

In contrast to formulations that rely on chemical reactions between reactive functional groups (e.g., between isocynate and polyol), the UV curable acrylates do not react chemically to form amide bonds. Rather, these UV curable acrylates form radicals when subjected to UV radiation and reactions between acrylate radicals effect the cross-linking process. The acrylate components form radicals through the unsaturated carbon-carbon double bond. Cross-linking of acrylates occurs through cross-linking of these carbon-carbon double-bond. In general, isocynate and polyol react chemically without UV curing. UV-cross-linking reactions allow inorganic particles to be embedded into the formulation, but chemically reactive isocynate-polyol does not, or gives less optimal performance because isocynate reacts with the surfactants that typically cover the inorganic particles; thus hindering the urethane reaction and also interfering with the inorganic particles in the process. In some embodiments, the formulation is continuously agitated to prevent agglomeration of the particles, similar to apparatus used to homogenize ink pigments used in ink jet printers. In addition, the continuous agitation of the mixture ensures fairly uniform distribution of the abrasive particles in the precursor. This can result in a more uniform distribution of particles through the polishing layer, which can lead to improved polishing uniformity. In some embodiments, viscosity of the formulation is carefully adjusted to ensure that there is minimum settling of the particles and that the particles are evenly distributed. In addition, surfactants can be incorporated on the particles to stabilize the particles within the formulation. Examples of surfactants include alkane thiols and polyalkylene glycols.

Particles that can be introduced into the formulation 128 include $SiO^2$, $CeO_2$, $TiO_2$, $Al_2O_3$ $BaTiO_3$, $HfO_2$, $SrTiO_3$, $ZrO_2$, $SnO_2$, MgO, CaO, $Y_2O_3$, $CaCO_3$. These particles can be nanoparticles or can more generally span the size range of 5 nm-50 µm.

Mechanical properties of the polishing layer can also be fine-tuned. For example, the softness and hardness of the pads can be adjusted by controlling the ratio of isocynate to polyol. A higher ratio of isocynate increases the hardness, while a higher ratio of polyol increases the softness. Similarly, mechanical properties such as modulus, tensile strength, tear strength, elongation to break and properties such as the glass transition temperature ($T_g$) can also be combinatorially tailored. For example, in making polyurethane acrylate, isocynate and polyol are first reacted in the desired amount to obtain oligomers having the selected hardness before acrylate groups are introduced to the polyurethane oligomers to form polyurethane acrylates, which are then UV cured to cross-link to form solid pad/polishing material. Various mechanical properties can also be tailored by mixing more than one polyurethane acrylate oligomers with reactive acrylate monomers (or diluents/thinners), that further increase the cross-linking density, which increases, for example, the $T_g$ and changes the corresponding mechanical properties.

Before the UV curable formulation 128 is placed in the mold 100, a mold release agent (e.g., polyethylene wax, silicone oil) may be added to the mold, for example, by spray coating the mold to ease the extraction of the cured product from the mold 100. Upon filling the mold 100 with the UV curable formulation 128, the formulation can be leveled inside the mold 100 to yield a flat upper surface 134 that faces a radiation source 120. A top cover 126 made up of a thin, UV transparent material can be used to level the formulation and cover the top of the mold 100. The top cover 126 can be as thin as possible, for example, 2-10 mils. The top cover 126 can be made of quartz with a fluorinated ethylene propylene (FEP) coating, e.g., a Teflon coating. This top cover 126 provides a cover material and assists in the leveling procedure. The top cover 126 can also help to prevent disturbance (e.g., from air flow/exhaust fans) of the formulation 128 while it cures.

The radiation source 120 can include UV lamps. The UV lamps can be arranged in an array having a width that is wide enough (in the dimension into the plane of the drawing) to cover the width of the conveyor belt 130 or at least the diameter 116 of the mold 110. The radiation source 120 can contain multiple UV lamps 122 and 124 used in succession. For example, in FIG. 2C the formulation in mold 100 will first interact with radiation emanating from UV lamp 122 before it interacts with radiation emanating from UV lamp 124, as the mold 100 travels along the direction indicated by arrow 132. In some embodiments, UV lamps 122 and 124 are each arranged in an array of UV lamps placed perpendicular to the travel direction of the conveyor belt 130.

For example, if electrodeless bulbs are used (such as gallium doped (V) bulb and iron doped (D) bulbs), the UV lamp 122 would be a V-UV bulb in an array of such V-UV bulbs while the UV lamp 124 would be a D-UV bulb, in an array of such D-UV bulbs. The array of UV lamps would cover the width of the conveyor belt (in a dimension into the plane of the drawing). The V-UV bulbs emit radiation having longer wavelength compared to the D-UV bulbs and the longer wavelength radiation helps to get the formulation near the bottom cover of the mold to cure, while the shorter wavelength radiation cures the portion of the formulation closer to the top cover. Alternatively, the UV lamp 122 can be a D-UV bulb in an array of such D-UV bulbs, while the UV lamp 124 can be a V UV bulb in an array of such V-UV bulbs. Thermal initiators can additionally be placed in the formulation near the bottom cover of the mold when the formulation is cured first with shorter wavelength radiation.

In some cases, the inorganic particles/porogens can block UV transmission. In other words, it can be more difficult for UV radiation to reach portions of the formulation underneath the particles. A thermal initiator can then be used instead or in conjunction with the photo-initiators to enable thicker materials to be cured. Exemplary photo-initiators include: α-hydroxy-ketones and blends, such as Irgacure 184, darocur 1173, irgacure 2959, irgacure 500, from BASF of Wyandotte, Mich.; α-amino-ketones, such as Irgacure 907, irgacure 369, irgacure 1300, from BASF of Wyandotte, Mich., benzildimethylketal, such as Irgacure 651, from BASF of Wyandotte, Mich., phenylbis(2,4,6-trimethylbenzoyl)-phosphine oxide (BAPO) & blends, such as Irgacure 819, darocur 4265, irgacure 819XF, irgacure 2020, irgacure 1700, irgacure 1800, irgacure 1850, from BASF of Wyandotte, Mich. and metallocenes, such as Irgacure 784 from BASF of Wyandotte, Mich. Exemplary thermal initiators include: tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 94 2,2-bis(tert-butylperoxy)butane, 1,1-bis(tert-butylperoxy)cyclohexane, 2,5-bis(tert-butylperoxy)-2,5-dimethylhexane, 2,5-bis(tert-Butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid and potassium persulfate.

When thermal initiators are used, it may be necessary to heat the mold 100 and the formulation 128 at temperatures ranges from 30° C. to 150° C. Thermal sources, both conductive and convective sources (such as IR lamps), may be used. Alternatively, instead of actively providing an external heat source, heat generated from the exothermic UV cross-linking reaction may be sufficient to trigger thermal initiators into reacting, such that no external heat source is needed. In addition, some thermal initiators evolve gases while reacting. The evolved gases can be trapped as bubbles, helping to create porosity in the polishing layer.

Furthermore, the methods and systems described herein allow the fabrication of a UV transparent CMP polishing pad. Alternatively, the polishing pad can have regions (e.g., one section) that are UV transparent (as opposed to the entire pad). The molecular structure of the polyurethane acrylate can be designed such that the oligomers and the monomers do not contain any UV absorbing species (e.g., benzyl groups would absorb UV while long aliphatic backbones will not absorb UV. In this way, a final cured solid material that is UV transparent can be produced. The UV transparent regions (e.g., 'window') of the polishing pad should ideally transmit radiation having wavelength as low as <300 nm. Such a polishing layer would eliminate the need for a detection window and allows monitoring to be conducted throughout the entire pad during polishing.

It is the photo-initiator that absorbs UV light to create radicals. These radicals attack the acrylate functional groups in either the oligomers or the monomers to create more radicals. These acrylate radicals then cross-link with other acrylate radicals from other polymer chains to form a cross-linked network.

Ten exemplary embodiments shown below in Tables 1-3. The ceria nanoparticles are generally <100 nm in size and the percent ranges are weight percentages.

TABLE 1

|  | Embodiment 1 | Embodiment 2 | Embodiment 3 | Embodiment 4 |
| --- | --- | --- | --- | --- |
| Polymer precursor | 95-99 wt % polyurethane acrylate oligomer resin | 94-99.5 wt % polyurethane acrylate oligomer resin | 84-98.5 wt % polyurethane acrylate oligomer resin | 54-98.5 wt % and 0-30% acrylate monomer |
| Initiator | 1-5% photo initiator | 0.5-5% photo initiator | 0.5-5% photo initiator | 0.5-5% photo-initiator |
| Nanoparticles | None | None | 1-10% ceria | 1-10% ceria |

TABLE 2

|  | Embodiment 5 | Embodiment 6 | Embodiment 7 | Embodiment 8 |
| --- | --- | --- | --- | --- |
| Polymer precursor | 54-98.5 wt % polyurethane acrylate oligomer resin and 0-30% acrylate monomer | 54-98.5 wt % polyurethane acrylate oligomer resin and 0-30% acrylate monomer | 54-98.5 wt % polyurethane acrylate oligomer resin | 54.98.4 wt % and 0-30% acrylate monomer |
| Initiator | 0.5-5% photo initiator | 0.5-5% photo initiator | 0.5-5% photo initiator and 0.1-0.5% thermal initiator (e.g., AIBN) | 0.5-5% photo-initiator and 0.1-0.5% thermal initiator (e.g., AIBN) |

TABLE 2-continued

|  | Embodiment 5 | Embodiment 6 | Embodiment 7 | Embodiment 8 |
|---|---|---|---|---|
| Nanoparticles | 1-10% ceria | 1-10% ceria | 1-10% ceria | 1-10% ceria |
| Additional steps | Mixed rapidly to create air bubbles and then quickly cast into the mold | Small bubbles of an inert gas (e.g. $N_2$) introduced and mixed rapidly with the formulation and then quickly cast into the mold. |  | Heated using IR lamps while simultaneously UV curing |

TABLE 3

|  | Embodiment 9 | Embodiment 10 |
|---|---|---|
| Polymer precursor | 44-98.4 wt % polyurethane acrylate oligomer resin and 0-30% acrylate monomer | 44-98.4 wt % polyurethane acrylate oligomer resin and 0-30% acrylate monomer |
| Initiator | 0.5-5% photo initiator and 0.1-0.5% thermal initiator (e.g., AIBN) | 0.5-5% photo initiator and 0.1-0.5% thermal initiator (e.g., AIBN) |
| Nanoparticles | 1-10% ceria | 1-10% ceria |
| Porogens | 1-10% porogens $Si_3N_4$ poly-hollow microspheres | 1-10% porogens $Si_3N_4$ poly-hollow microspheres |
| Additional steps | Heated using IR lamps while simultaneously UV curing | Mold is heated to 130° C. from the underside using heating rods (conduction) as well as surrounding IR lamps (convection). The formulation is simultaneously cured using one or more UV sources |

The polishing layers can have pores of various sizes, for example, between 1-50 micrometers. The $Si_3N_4$ poly-hollow microspheres listed in Table 3 can have sizes of between 1-50 micrometers.

A number of implementations have been described. Nevertheless, it will be understood that various modifications may be made. For example, either the polishing pad, or the carrier head, or both can move to provide relative motion between the polishing surface and the substrate. The polishing pad can be a circular or some other shape. An adhesive layer can be applied to the bottom surface of the polishing pad to secure the pad to the platen, and the adhesive layer can be covered by a removable liner before the polishing pad is placed on the platen. In addition, although terms of vertical positioning are used, it should be understood that the polishing surface and substrate could be held upside down, in a vertical orientation, or in some other orientation.

Accordingly, other implementations are within the scope of the following claims.

What is claimed is:

1. A method of fabricating a chemical mechanical polishing pad, comprising:
   introducing a polymer precursor containing acrylate functional groups into a mold;
   providing abrasive particles and a photo-initiator in the polymer precursor to form a mixture, wherein providing the abrasive particles includes introducing inorganic precursors that react in the mixture to form the abrasive particles;
   while the mixture is contained between a bottom plate and a top cover of the mold, exposing the mixture to ultraviolet radiation through a transparent section of the mold to cause the polymer precursor to form radicals; and
   forming a polymer matrix from the polymer precursor by causing the radicals to cross-link with one another, a polishing layer of the polishing pad comprising the polymer matrix having the abrasive particles dispersed therein.

2. The method of claim 1, further comprising:
   mixing the polymer precursor, the abrasive particles, and the photo-initiator in the presence of a gas, the mixing performed at sufficient rapidity to generate gas bubbles in the mixture, and
   immediately exposing the mixture to the ultraviolet radiation to trap the gas bubbles in the polishing layer.

3. The method of claim 1, further comprising:
   introducing bubbles of gas to the polymer precursor prior to mixing the polymer precursor, the abrasive particles that are nanoparticles, and the photo-initiator, and
   exposing the mixture to radiation immediately after mixing the polymer precursor.

4. The method of claim 1, further comprising introducing porogens to the mixture before exposing the mixture to the ultraviolet radiation to provide pores in the polishing layer.

5. The method of claim 1, wherein the ultraviolet radiation produces radicals from the polymer precursor and the polymer precursor is cured by cross-linking of the radicals.

6. The method of claim 5, wherein the polymer precursor containing acrylate functional groups comprises an acrylate oligomer or a reactive acrylate monomer, and wherein cross-linking occurs between unsaturated carbon-carbon bonds in the acrylate oligomers or reactive acrylate monomer.

7. The method of claim 6, wherein the polymer precursor comprises 54-98.5 wt % of polyurethane acrylate oligomer and 0-30% acrylate monomer, and the abrasive particles comprise 1-10% ceria nanoparticles and the initiator comprises 0.5-5% of a photo initiator.

8. The method of claim 1, wherein exposing the mixture to ultraviolet radiation comprises exposing the mixture first to ultraviolet radiation in a first wavelength band, and then exposing the mixture to ultraviolet radiation in a second wavelength band having wavelengths shorter than the first wavelength band.

9. The method of claim 1, further comprising introducing a thermal initiator to the mixture and subjecting the mixture to a temperature sufficient to activate the thermal initiator.

10. The method of claim 1, wherein the abrasive particles have dimensions between 5 nm 50 microns and comprise one or more of $SiO_2$, $CeO_2$, $TiO_2$, $Al_2O_3$ $BaTiO_3$, $HfO_2$, $SrTiO_3$, $ZrO_2$, $SnO_2$, $MgO$, $CaO$, $Y_2O_3$, or $CaCO_3$.

11. The method of claim 1, wherein the abrasive particles further comprise surfactants disposed on surfaces thereof, wherein the surfactants reduce settling of the abrasive particles in the mixture.

12. The method of claim 1, wherein the polymer precursor comprises polyurethane acrylate, polyester acrylate or polyether acrylate.

13. The method of claim 1, wherein the polymer precursor cures by cross-linking between unsaturated carbon-carbon bonds in acrylate oligomers or reactive acrylate monomer in the polymer precursor.

14. The method of claim 1, further comprising using the top cover to create a level profile on a surface of the mixture closest to the ultraviolet radiation.

15. The method of claim 1, further comprising exposing the mixture to infrared (IR) radiation and using a thermal initiator to activate curing of the polymer precursor, the thermal initiator configured to generate gas bubbles in the mixture, and trapping the gas bubbles to create porosity in the polishing layer.

16. The method of claim 1 wherein the transparent section of the mold comprises quartz.

\* \* \* \* \*

UNITED STATES PATENT AND TRADEMARK OFFICE
CERTIFICATE OF CORRECTION

PATENT NO. : 10,086,500 B2
APPLICATION NO. : 14/575608
DATED : October 2, 2018
INVENTOR(S) : Mahendra Christopher Orilall, Rajeev Bajaj and Fred C. Redeker

It is certified that error appears in the above-identified patent and that said Letters Patent is hereby corrected as shown below:

Column 13, Line 17, in Claim 10, delete "5 nm 50" and insert -- 5 nm – 50 -- therefor.

Column 13, Line 18, in Claim 10, after "Al2O3" insert -- , --.

Column 14, Line 18, in Claim 16, after "claim 1" insert -- , --.

Signed and Sealed this
Twenty-fifth Day of December, 2018

Andrei Iancu
*Director of the United States Patent and Trademark Office*